United States Patent [19]

Girsh

[11] Patent Number: 5,204,134

[45] Date of Patent: * Apr. 20, 1993

[54] HYPOALLERGENIC MILK PRODUCTS FROM NATURAL AND/OR SYNTHETIC COMPONENTS AND PROCESS OF MAKING

[75] Inventor: Leonard S. Girsh, South Palm Beach, Fla.

[73] Assignee: Immuno Path Profile, Inc., Melrose Park, Pa.

[*] Notice: The portion of the term of this patent subsequent to Feb. 16, 2010 has been disclaimed.

[21] Appl. No.: 754,872

[22] Filed: Sep. 4, 1991

Related U.S. Application Data

[63] Continuation-in-part of Ser. No. 562,777, Aug. 3, 1990, Pat. No. 5,064,674, which is a continuation-in-part of Ser. No. 297,451, Jan. 13, 1989, Pat. No. 4,954,361.

[51] Int. Cl.[5] ........................ A23C 9/142; A23C 9/20
[52] U.S. Cl. ........................... 426/580; 426/491; 426/583; 426/585; 426/656; 426/660; 426/801
[58] Field of Search ............... 426/491, 580, 583, 585, 426/656, 660, 801

[56] References Cited

U.S. PATENT DOCUMENTS

| | | |
|---|---|---|
| 677,159 | 6/1901 | Meyenberg . |
| 1,210,918 | 1/1917 | Eigelberner . |
| 2,414,837 | 1/1947 | Riggs .................................. 99/62 |
| 2,437,080 | 3/1948 | Daniel .................................. 99/57 |
| 2,714,068 | 7/1955 | Bernhart et al. .................. 426/580 |
| 2,903,358 | 9/1959 | Block et al. ........................ 99/54 |
| 3,003,882 | 10/1961 | Peat ................................... 426/804 |
| 3,642,493 | 2/1972 | Arndt .................................. 99/64 |
| 3,669,678 | 6/1972 | Kraft .................................. 426/583 |
| 3,843,838 | 10/1974 | Arndt ................................. 426/585 |
| 3,930,039 | 12/1975 | Kuipers ............................. 426/583 |
| 3,978,234 | 8/1976 | Bosund et al. .................... 426/804 |
| 4,018,752 | 4/1977 | Buhler et al. ..................... 426/804 |
| 4,042,575 | 8/1977 | Eustache .......................... 426/583 |
| 4,202,909 | 5/1980 | Pederson, Jr. ................... 426/583 |
| 4,293,571 | 10/1981 | Olofasson et al. ............... 426/657 |
| 4,341,801 | 7/1982 | Weissman ........................ 426/583 |
| 4,358,464 | 11/1982 | Soehnlen ......................... 426/491 |
| 4,358,465 | 11/1982 | Brule et al. ...................... 426/491 |
| 4,389,425 | 6/1983 | Burr, II ............................ 426/598 |
| 4,389,426 | 6/1983 | Reissmann et al. ............. 426/804 |
| 4,402,938 | 9/1983 | Collins ............................. 426/491 |
| 4,457,220 | 7/1984 | Entremont et al. .............. 99/451 |
| 4,476,143 | 10/1984 | Czulak et al. .................... 426/804 |
| 4,485,040 | 11/1984 | Roger et al. ..................... 260/122 |
| 4,518,616 | 5/1985 | Czulak ............................. 426/583 |
| 4,528,204 | 7/1985 | Shank .............................. 426/804 |

(List continued on next page.)

FOREIGN PATENT DOCUMENTS 22696 1/1981 European Pat. Off. .
189161 9/1988 European Pat. Off. .
291980 11/1988 European Pat. Off. .

(List continued on next page.)

OTHER PUBLICATIONS

Jenness, R., et al., "Preparation and Properties of a Salt Solution which Simulates Milk Ultrafiltrate", *The Netherlands Milk and Dairy Journal*, vol. 16, NR. 3, pp. 153–164 (Jul.-Sep. 1962).

Sandstrom, B., et al., "Zinc Absorption From Human Milk, Cow's Milk, and Infant Formulas", Am. J. Dis. Child, vol. 137, Aug. 1983, pp. 726–729.

Theuer, R. C. et al., "Effect of Processing on Availabil- (List continued on next page.)

*Primary Examiner*—Jeanette Hunter
*Assistant Examiner*—Helen Pratt
*Attorney, Agent, or Firm*—Seidel, Gonda, Lavorgna & Monaco

[57] ABSTRACT

A hypoallergenic milk which has the flavor and smell of natural whole mammalian milk. The hypoallergenic milk is formed by combining a mixture of mineral salts approximately the mineral content of milk, carbohydrate and hypoallergenic protein. Hypoallergenic fat, vitamins and other components are optionally added to meet the minimum daily nutritional requirements for milk. The ingredients are ultrafiltered either separately or in combination as needed to remove allergenic molecules.

165 Claims, No Drawings

U.S. PATENT DOCUMENTS

| | | | |
|---|---|---|---|
| 4,547,386 | 10/1985 | Chambers et al. | 426/583 |
| 4,614,653 | 9/1986 | Kakade | 426/583 |
| 4,670,268 | 6/1987 | Mahmound | 426/804 |
| 4,692,338 | 9/1987 | Irvine et al. | 426/583 |
| 4,711,953 | 12/1987 | Roger et al. | 530/366 |
| 4,716,120 | 12/1987 | Tsay et al. | 436/809 |
| 4,954,361 | 9/1990 | Girsh | 426/580 |
| 4,963,387 | 10/1990 | Nakagawa et al. | 426/649 |
| 5,064,674 | 11/1991 | Girsh | 426/580 |

FOREIGN PATENT DOCUMENTS

| | | |
|---|---|---|
| 364053 | 4/1990 | European Pat. Off. . |
| 469206 | 8/1990 | European Pat. Off. . |
| 2386264 | 11/1978 | France . |
| 2074601 | 11/1981 | United Kingdom . |

OTHER PUBLICATIONS ity of Iron Salts in Liquid Infant Products, Experimental Soy Isolate Formulas", J. Agr. Food Chem. vol. 19, No. 3, May/Jun. 1971, pp. 555–558.

The Wall Street Journal, "Diary Dilemma Milk is Found Tainted with a Range of Drugs Farmers Give Cattle", Dec. 29, 1988 at p. 1.

The Wall Street Journal, "Nestle To Sell Infant Formula Soon in the U.S.", Jun. 6, 1988.

McGilvery, R. W., et al., *Biochemistry A Functional Approach,* at 615 (2d ed. 1979).

*The Condensed Chemical Dictionary,* 203, 1095 (10th ed. 1987).

*Fundamentals of Dairy Chemistry,* 102–103 and 680–681, 3 ed. (N. P. Wong ed. 1988).

Hargrove, "Conversion of Deproteinized Whey to Solid Animal Feeds", *Journal Of Dairy Science,* vol. 57, No. 5, Abstract M19 (p. 583 1974).

HYPOALLERGENIC MILK PRODUCTS FROM NATURAL AND/OR SYNTHETIC COMPONENTS AND PROCESS OF MAKING

CROSS-REFERENCE TO RELATED APPLICATIONS

This is a continuation-in-part of my copending, commonly assigned U.S. patent application Ser. No. 562,777, now U.S. Pat. No. 5,064,674, filed Aug. 3, 1990, which is a continuation-in-part of U.S. patent application Ser. No. 297,451, filed Jan. 13, 1989, now U.S. Pat. No. 4,954,361. The entire disclosures of U.S. Pat. No. 5,064,674 and U.S. Pat. No. 4,954,361 are incorporated herein by reference.

FIELD OF THE INVENTION

A hypoallergenic milk made from the synthetic equivalent of milk mineral salts is disclosed herein. The hypoallergenic milk has the flavor and smell of whole natural milk, but lacks the component which causes allergic reactions. The hypoallergenic milk has the favorable features of cow's milk, but lacks foreign animal protein, and therefore may thus be regarded as "humanized" cow's milk.

BACKGROUND OF THE INVENTION

Many persons suffer from various allergies, many of which are caused by ingesting food containing allergens. Although the biochemistry of allergic reactions is not precisely understood, it is believed that the allergens cause, upon ingestion or other contact with the body, a specific reagin (or skin sensitizing antibody) to be formed in the bloodstream. The ability to produce reagins, chemically identified as IgE, in response to a given allergen is thought to be an inherited characteristic that differentiates an allergic person from a non-allergic person. The specificity of the allergen-reagin reaction and its dependence on molecular configuration of the allergen and reagin is similar to the antigen-antibody reaction. The degree of sensitization is dependent upon the extent of exposure to or ingestion of the allergen. In this respect, the allergen molecule, which is often a protein, may be regarded as a "key" which exactly fits the corresponding structural shape of the reagin molecule which may be likened to a "lock". When the key is inserted into the lock, an allergic reaction results.

Different materials contain different allergens. Not all persons may have the reagin with which a particular allergen can react. Therefore, some persons are not allergic to particular materials. However, when a particular reagin reacts with a specific allergen, an allergic reaction results in any number or type of symptoms. Allergic reactions range from very mild symptoms to death. For example, symptoms, both mild and severe, include skin rashes (allergic eczema and urticaria), dermal symptoms, respiratory symptoms (including allergic rhinitis and bronchial asthma), gastrointestinal symptoms, and migraine. Violent illnesses have been known to include shock-like reactions, vascular collapse and allergic anaphylaxis.

Many allergists have recognized that milk contains proteins which are allergens. The allergens of cow's milk frequently cause the formation of reagins (IgE) in many persons. Thus, many persons, including both adults and children, are allergic to cow's milk.

Milk is very frequently used in popular food products. It is used not only in cooking and baking, but it is included in hidden ways as well. For example, casein, caseinate milk solids, whey, whey solids, and lactralbumin are milk products which are components of cookies, cheeses, chocolate (in the form of milk chocolate), ice cream, butter and may be used as flavoring for other food products, such as breakfast cereals, hot and cold beverages, and desserts. These products can also be found in gravies, breading, whole, dry or evaporated milk, yogurt, sherbet, breads, waffles, creamed vegetables, mashed potatoes, pudding, creamer or any diverse products such as hot dogs or spaghetti.

Milk products, which are marketed today as hypoallergenic milk, are neither uniformly hypoallergenic to all patients, nor made from cow's milk. For example, heat processed milk, in which albumin is denatured, is of modest benefit to only a limited number of patients. A hypoallergenic vegetable soybean milk formulation devised in China has an objectionable smell and after taste. Hypoallergenic milk produced by the acid process which imitates the stomach's digestive process by utilizing hydrochloric acid to break up proteins, e.g. casein, has an objectionable smell and taste.

Accordingly, there is a need for a hypoallergenic milk which also has the taste and smell of cow's milk.

U.S. Pat. No. 4,293,571 discloses a process for the purification of purified protein hydrolaysate. In this process, an aqueous solution of protein is subjected to hydrolysis, then is heat treated to denature the protein. The heat-treated material is then ultrafiltered to eliminate protein.

U.S. Pat. No. 4,402,938 discloses a food and method for making the same from colostrum and milk. In this process, the udder of an ungulate is stimulated with an antigen-like material so that the food factor of the whey is enhanced. The enhanced milk is subsequently ultrafiltered. The retentate is discarded and the permeate is saved. Preservatives are added to the milk/colostrum prior to ultrafiltration.

The inventor's commonly assigned U.S. Pat. No. 4,954,361 and application Ser. No. 562,777, filed Aug. 3, 1990 disclose hypoallergenic milk products from ultrafiltration of cow's milk. The resulting good-fasting products are substantially free of cow's milk protein and fat. While these products represent an advance in the state of the art, they are derived from whole milk or fractions thereof. What is needed is a product which has the good taste and nutritional value of milk-based products, but which may be prepared from synthetic sources. According to the invention hereinafter described, the mineral salts, carbohydrate and protein do not necessarily have to be derived from milk.

SUMMARY OF THE INVENTION

A hypoallergenic milk product is provided comprising (i) a mineral salt component comprising a mixture of mineral salts approximating the mineral content of natural milk, (ii) a carbohydrate component comprising one or more carbohydrates and (iii) a hypoallergenic protein component which may advantageously comprise hypoallergenic protein per se, amino acids, polypeptides having a molecular weight of not more than about 5.0 kDa, or a combination thereof.

The hypoallergenic milk product is prepared by the steps of forming an aqueous mixture of the mineral salt component, carbohydrates, and hypoallergenic protein component. One or more of the separate components, and/or any combination thereof, are filtered through a filtration membrane, which will only allow molecules with a molecular weight of less than or equal to about 5 kDa to pass therethrough. The permeate is thereafter collected and utilized. The product may be optionally supplemented with hypoallergenic fat, vitamins and additional minerals. The filtration step(s) are necessary for any components which may be derived from milk sources, e.g., whey-derived components, or components which may otherwise contain allergenic protein.

It is an object of this invention to produce a new and useful hypoallergenic food product from a synthetic or natural mixture of the mineral salts found in natural mammalian milk, and from non-milk or milk-derived carbohydrates or mixtures thereof.

It is another object of this invention to obtain the good taste of natural whole or skim milk.

It is an object of the invention to provide a hypoallergenic milk product which retains the nutritional content of natural milk.

It is an object of the invention to provide a hypoallergenic milk product which may serve as a vehicle for delivery of specialized nutritional products.

It is an object of the invention to provide a hypoallergenic milk product at low production cost, possessing the excellent taste of farm fresh milk, yet free of animal protein.

DETAILED DESCRIPTION OF THE INVENTION

The hypoallergenic milk product disclosed hereinafter is formulated upon the fact that protein contained in natural milk is the source of allergens that react with reagins to produce allergic reactions. Similar to the antigen-antibody reaction, it is believed that the allergen molecules in cow's milk, which usually are proteins, have a specific structure which acts as a "key", while the reagins have a corresponding structure which acts as a "lock". While this is the theory upon which the hypoallergenic milk is based, this theory is not meant to be limiting upon the embodiments disclosed hereinafter.

A mixture of mineral salts which will provide the inorganic content of mammalian milk, forms the basis of the present product. The mineral salt mixture, typically in the form of an aqueous solution thereof, is combined with carbohydrate, and a hypoallergenic protein component in amounts approximating the mineral salt, carbohydrate and protein content of natural milk. Hypoallergenic fat is optionally added. Further optional ingredients include additional minerals and trace minerals, vitamins and flavoring agents. Preferably, the hypoallergenic milk product contains, on a weight percentage basis, about 0.7–0.9% mineral salts, about 3–4% carbohydrate, about 1–4% hypoallergenic protein component, about 0–4% hypoallergenic fat, the balance comprising water and minor optional ingredients.

The mineral salt mixture may be prepared synthetically, by combining mineral salts which will provide a solution approximating the mineral content of natural milk, in the approximate proportions found in milk. Mineral salts useful for this purpose include the following: potassium phosphate (monobasic), potassium citrate, sodium citrate, potassium sulfate, calcium chloride, magnesium citrate (monobasic), potassium carbonate, and potassium chloride. They are combined and dissolved in the appropriate volume of water to form a mineral salt solution which is the basis for the present hypoallergenic synthetic milk product. While the above salts represent the more significant mineral salts of cow's milk, "mineral salt mixture" as used herein shall mean a mixture of substantially the majority of the above salts, or equivalent salts providing the mineral content of natural milk, plus any additional organic or inorganic salts which may be added without prejudice to the taste of the resulting product. The mineral salt component thus prepared is of course hypoallergenic since it contains no protein.

Whey is the component of milk which remains after all or a substantial portion of the fat and casein contained are removed. Various fractions or variants of whey are known, such as, for example, sweet whey permeate (i.e., permeate of whey prepared by crude filtration), dried sweet whey, demineralized whey, delactose whey, whey protein concentrate, and the like. Delactosed whey, that is, whey from which the lactose has been removed, may be advantageously utilized as a natural source of the milk mineral salt component of the present hypoallergenic milk product. Delactosed whey is commercially available in liquid or powder form.

The carbohydrate component may comprise any suitable monosaccharide, disaccharide, polysaccharide or combination thereof. Such sugars include, but are not necessary limited to lactose, galactose, glucose, sucrose, fructose, maltose, maltodextrins and mixtures thereof. The preferred sugar is lactose, which is derived from milk. However, care should be taken in processing carbohydrate from commercial sources, particulary the milk sugars such as lactose, before inclusion in the hypoallergenic milk product. Lactose purified from cow's milk or whey contains as much as 0.01 wt. % milk protein, which becomes trapped in the lactose crystals during the purification process. Carbohydrate derived from non-milk sources may also contain small but significant amounts of allergins. For example, sugars derived from corn syrup or sugar cane may contain 0.1% protein. Thus the carbohydrate component of the invention is advantageously ultrafiltered before use as hereinafter described, or alternatively, the complete milk product as constructed from its component parts is ultrafiltered. Ultrafiltration, as hereinafter described, will remove any trace amounts of hypoallergenic protein which may be contained in the carbohydrate component.

The hypoallergenic protein component may comprise hypoallergenic protein per se, such as protein from cereal or vegetable sources. Alternatively, or additionally, it may comprise free amino acids, or polypeptides of animal source, provided the polypeptides are not larger than about 5 kDa, preferably not larger than about 3.5 kDa, more preferably not larger than about 2 kDa, and most preferably not more than about 1 kDa.

Sources of hypoallergenic protein include, but are not limited to: oat cereal (which has a high protein level of about 18%); rice cereal; barley cereal; or any other food source having a low allergenicity and ample protein content. Vegetable sources of protein may also be used, so long as they have a low allergenic potential. Vegetable sources of low allergenic protein include, for example, potato and soy isolate. Combinations of the foregoing proteins may also be used.

Oat cereal, for example oatmeal, is preferred because it not only enhances the protein content, but also adds to the taste of the resulting product. The oat cereal is used as a very finely ground flour, to facilitate dissolution into the permeate. About 5 to 10 grams of the very finely ground and sieved cereal flour is added to about 100 cc of product. The resulting mixture has a protein content of about 0.9 to 1.8% by weight, which is similar to human breast milk.

When cereals are used, protein soy isolate may also be added to enrich the lysine amino acid value of the cereal. Additionally, the protein may be supplemented with, among other things, methionine, cystine, and iodine to meet the minimum daily requirements.

Protein soy isolate is preferred for use in hypoallergenic milk which is intended for infants, who require a single source of protein, or children and adolescents with important growth factor requirements. Cereal hypoallergenic protein sources can be used in the hypoallergenic milk for adults. For example, if a multiple source of protein is desired, any combination of hypoallergenic protein sources may be used.

In lieu of, or in addition to, supplementation with hypoallergenic protein, the product may be supplemented with amino acids, short chain polypeptides, or a combination of amino acids and short chain polypeptides. By "short chain polypeptide" is meant a polypeptide having a molecular weight of not more than about 5 kDa, preferably not more than about 1.5 kDa, more preferably not more than about 1 kDa. Free amino acids and short chain polypeptides are hypoallergenic regardless of source, and therefore will not contribute to the allergenicity of the milk product. Preferably, the amino acids comprise a mixture of amino acids, most preferably a mixture containing at least the nine amino acids which are essential to the human diet:

| Threonine | Valine | Phenylalanine |
| Methionine | Isoleucine | Histidine |
| Lysine | Leucine | Tryptophan |

The short chain polypeptides may comprise individual polypeptides or a mixture of polypeptides. The short chain polypeptides and amino acids may be obtained by appropriate hydrolysis of any suitable polypeptides or proteins. Preferably, they are obtained from milk proteins, so that the reconstituted hypoallergenic milk product of the invention maintains a portion of the protein nutritional content of whole milk. Hydrolysates of milk proteins are commercially available. For example, a series of hydrolysates are produced by Deltown Chemurgic Corporation, Fraser, N.Y., under the trademark "DELLAC". "DELLAC" CE80PS is a highly hydrolyzed pancreatic digest of casein. "DELLAC" LE80PS is a hydrolyzed pancreatic digest of another milk protein, lactalbumin. High-performance liquid chromatography indicates that these products are free of polypeptides having a molecular weight of greater than about 1.5 kDa. Hydrolysates of non-milk proteins may also be employed, e.g. "DELLAC" SE50M, which is a papaic digest of soy flour. Other milk protein hydrolysates are sold under the trademark "ALATAL" by New Zealand Milk Products, Inc., Petaluma, Calif. (a division of the New Zealand Dairy Board, Wellington, New Zealand).

Each of the aforementioned products may be advantageously utilized in the practice of the invention since they are either free of allergenic milk protein, or are at least free of any milk-derived polypeptides large enough to be considered allergenic.

The protein component is optionally ultrafiltered prior to addition to the other product components. Where the protein component comprises vegetable protein, amino acids, or short chain polypeptides, filtration is probably not necessary, as these materials are hypoallergenic. However, where filtration of the protein component is practiced, either separately or by filtration of the completed milk product, it may then be feasible to utilize as a source of short chain polypeptides milk protein hydrolysates which may include some polypeptide species large enough to be considered hyperallergenic. These larger species will be removed by the filtration step. Preferred such milk protein hydrosylates include "ALATAL" 817 and "DELLAC" LE80GF, which are enzymatic digests of lactalbumin. The latter product consists of 80% by weight protein-derived materials, of which 97 wt. % comprises short chain polypeptide and 3 wt. % whole protein. "DELLAC" LE80GF has an average molecular weight to about 2 kDa.

Hydrolysates of lactalbumin are particularly preferred for supplying short chain polypeptides and/or amino acids in the practice of the present invention. Lactalbumin and its hydrolysates contain a relative surplus of the four essential amino acids lysine, methionine, threonine and isoleucine. They can, therefore, be an important supplement to cereal or vegetable protein which is somewhat deficient in these amino acids. Lactalbumin hydrolysates are particularly useful when combined with other protein sources, such as soy isolate or casein hydrolysate, which may be somewhat deficient in the amino acids cystine and methionine.

It should be noted that while the aforementioned refined polypeptide-containing products result from enzyme hydrolysis of single milk proteins, their addition to the permeate prepared according to the present invention does not significantly impact on the taste of the final reconstituted hypoallergenic milk product. This should be contrasted with the situation where whole milk, before filtration, is treated in situ with hydrolytic enzymes. This form of in situ hydrolysis of milk proteins deleteriously impacts on the taste of the resulting product.

The sources of the optional fat component may include deproteinized clear butter and butter oil or butter fat, polyunsaturated and mono- and/or polyunsaturated vegetable oil or fat from milk free margarine sources, sesame, safflower, and the like, or mixtures thereof. The foregoing fats are hypoallergenic.

The fat is optionally added to the mineral salt solution so that the fat content of the final product ranges between 0% and about 4% by weight depending upon whether skim, 1%, 2% or 4% homogenized milk is desired. For adults where atherosclerosis prevention is of great importance, the fat source may comprise about ¼ to about ½% deproteinized butter oil and/or about ½ to about 2% low fat polyunsaturated vegetable fat.

Deproteinized hypoallergenic butter for supplementing the permeate may be made from commercially available salt-free, sweet 99.99% anhydrous milk fat. The milk fat is melted in boiling water. The resulting butter oil is then removed from the boiling water, such as by pipetting it off the surface of the water. The boiling water results in extreme heat denaturation of protein and also renders the resulting heat-denatured protein insoluble. The process removes, by dilution and washing of the milk fat with water, any protein which may be contained in the fat as a contaminant. The process may be repeated any number of times to ensure the purity of the resulting butter product.

Vitamins, and further minerals in addition to those present in the mineral salt component, are also optionally added to the protein- and fat-supplemented mineral salt solution. Such vitamins and minerals are added, so that the resulting milk products meet the minimum daily requirement. By way of non-limiting example, the following may be added, based upon one quart of mineral salt solution supplemented with carbohydrate, hypoallergenic protein and fat: 400 micrograms of water dispersible Vitamin D; 2100 micrograms of water-dispersible Vitamin A; 60 milligrams of Vitamin C acetate; folic acid; calcium pantothenate; biotin; pyridoxine; vitamin $B_3$; vitamin $K_1$ (0.1 mg/l); vitamin $B_{12}$ (1.5 mg/l); vitamin E (20 $\mu$l/l); thiamin (0.60 mg/l); riboflavin (0.6 mg/ml); vitamin $B_6$ (0.4 mg/ml); minerals such as calcium as phosphate, carbonate or triphosphate; iron as ferrous sulfate; and zinc as zinc sulfate. Other added minerals may advantageously include cupric sulfate, sodium iodide, potassium carbonate; potassium chloride; and sodium selenite. Preferred amino acids which may be added include L-cysteine, L-tyrosine and L-tryptophan. The foregoing are exemplary of the vitamins and minerals that may be added to the hypoallergenic milk. Of course, other vitamins and minerals which are known to those of ordinary skill in the art may also be added.

Additives to enhance the flavor and consistency of the hypoallergenic milk may also be added. Exemplary additives include: hypoallergenic bean gum derived from guar gum (for example, about 3.7 to about 4.7 kg of bean gum per 10,000 liters of hypoallergenic milk); carrageenan; and/or lecithin of hypoallergenic vegetable bean source, such as soy bean (for example, about 24 kg/10,000 liters of hypoallergenic milk) or soy-derived emulsifier. Each of these additives imparts a cream consistency (acts as an emulsifier) to the hypoallergenic milk. Natural vanilla may also be added to enhance the flavor of hypoallergenic milk.

The hypoallergenic protein component, or mineral salt component when derived from a milk product such as delactose whey, or the carbohydrate component when it comprises lactose or other milk-derived sugar, may be ultrafiltered to ensure that no hypoallergenic protein contaminants are included in the hypoallergenic milk product. The components may be filtered separately or in combination with one another.

According to one embodiment, an ultrafiltration membrane utilized for filtration is sized to prevent the passage of any substance with a molecular weight greater than 5 kDa. Such excluded substances include, but are not limited to: milk protein; viable or non-viable bacteria; bacterial protein antigen; and milk fat. Alternately, ultrafiltration membranes which prevent the passage of any substance with a molecular weight greater than 1 or 2 kDa may also be used. Ultrafiltration membranes capable of preventing the passage of or 2 kDa molecular weight substances have proportionately smaller pore sizes.

The following contaminating milk proteins which may be present in protein or carbohydrate components derived from milk sources, are trapped by the ultrafiltration membrane (molecular weights are noted in parenthesis): alpha lactalbumin (14 kDa); kappa casein (23 kDa); alpha S-1 casein; alpha S-2 casein; beta casein (24 kDa); beta lactoglobulin (37 kDa); bovine serum albumin (65 kDa); and immunoglobulins (>100 kDa). These milk proteins are considered allergenic. Beta lactoglobulin is a dimer at pH 6.6.

It has been found that decreasing the sizing of the filter decreases the relative amount of three milk proteins - alpha lactalbumin, beta lactoglobulin and bovine serum albumin. Thus, where 0.27, 0.33 and 0.01 units of these proteins, respectively, are found in products prepared with a 10 kDa membrane (i.e., a filter membrane which excludes molecules having a molecular weight greater than 10 kDa), products prepared with 5 kDa dalton filters contain 0.03, 0.03 and 0.01 units of these same proteins, respectively. A dialysate product, prepared using a 3,5 kDa dialysis membrane, contains less than 0.01 units of each of these protein species, resulting in a protein-free dialysate, based upon the limits of the electrophoretic method employed to analyze for protein.

Ultrafiltration membranes having a 3.5 kDa or less molecular weight cut-off are preferred. Polyether sulfone membranes having a 1 kDa or 2 kDa cut-off are available, for example, from Advanced Membrane Technology, San Diego, Calif. and Dow Denmark, Naskov, Denmark, respectively. Ultrafiltration membranes made of ceramic materials may also be used.

Ceramic filters have an advantage over synthetic filters. Ceramic filters can be sterilized with live steam so that the chemical agents, such as chlorine, do not have to be used to sterilize the filter. Synthetic filters, on the other hand, cannot be sterilized with live steam, but instead they must be sterilized with chemical agents, for example, a solution of 200 parts per million (p.p.m) chlorine solution may be used to disinfect the membrane. If a chemical agent is used to disinfect the membrane, the chemical agent may be washed from the filter by flushing the filter with two passes of milk.

A pressure gradient is preferably applied across the ultrafiltration membrane to facilitate filtration. Preferably, the pressure gradient is adjusted to maintain a filter flux of about 24 liters/$m^2$-hour, which is the typical dairy plant filter flux. The filter is advantageously first primed with a small amount of product and the permeate discarded, prior to beginning filtration. Priming of the filter in this manner is believed to be advantageous to filtering efficiency.

The pH of the product during filtration should be within the range of about 2 to about 11. The preferred pH is about 6.6.

The temperature of the product component during ultrafiltration should be within the range of about 4° C. (i.e., about 40° F.) to about 66° C. (i.e., about 150° F.).

Instead of ultrafiltration, any allergenic components of the milk component may be removed by dialysis. As is well known, dialysis operates on a principal akin to osmosis. Any allergenic protein in the permeate is effectively trapped utilizing a 5 kDa, (preferably a 3.5 kDa, 2 kDa or 1 kDa) ultrafilter or dialysis membrane.

With dialysis, as with ultrafiltration, the permeate that passes through the membrane, i.e. the hypoallergenic component, is saved and utilized. The retentate, i.e., the material which does not pass through the membrane, is discarded or utilized in other commercial applications. A dialysis membrane capable of preventing the passage of materials with a molecular weight of 5 kDa may be used. Other membranes, however, could be used so long as the hyperallergenic component is excluded from the permeate.

Preservatives such as phenol, parabens etc. are preferably not added to the hypoallergenic milk product. The product may be supplemented, as discussed above, while in liquid form. Alternatively, or additionally, it may be freeze dried in any conventional manner, then reconstituted with liquid supplements at a later time.

After the hypoallergenic protein component, carbohydrate and optional fats, vitamins and additives to enhance flavor and consistency have been added to the mineral salt solution, the resulting hypoallergenic milk is preferably blended in an emulsifying and diffusing apparatus operating at between about 2,500 and about 3,500 r.p.m., to ensure thorough mixing. The blended hypoallergenic milk is then homogenized at a pressure ranging from about 138 to about 276 Bar (i.e., about 2,000 to about 4,000 P.S.I.), pasteurized at about 77° C. (170° F.) for about 30 minutes, and then flashed sterilized at about 143° C. (290° F.) for about 12 seconds and packaged into a aseptic containers. Such containers are made of materials which will not leach into the packaged product. The materials include, but are not limited to, glass, waxed cardboard or metal. Alternatively, the product may be pasteurized before the various supplements have been added.

The meticulous removal of substantially all allergenic protein by an ultrafilter or dialysis membrane has superior advantage regarding hypoallergenicity. The product is free of protein as evidenced by the absence of protein bands upon SDS-PAGE, sensitive to the application of 30 nanograms/microliter or greater concentration of protein. Thus, it is understood that as used herein, the expression "substantially completely deproteinized" or "substantially free of milk protein" in referring to a preparation, means a preparation free of protein bands upon SDS-PAGE sensitive to the presence of protein concentrations of 30 nanograms/microliter or higher.

Where the carbohydrate component comprises lactose, lactase enzyme may be added to the hypoallergenic milk for use by lactose-intolerant individuals. Alternatively, in lieu of the preferred sugar lactose, other sugars may be utilized, such as glucose, fructose, maltose or maltodextrin.

The hypoallergenic milk may be substituted for milk components in any formulation in which milk components are used. For example, hypoallergenic milk may be used as a beverage or in beverages, or solid food products such as candy, milk chocolate, cookies, cakes, breakfast cereals and the like. The hypoallergenic milk product may also be utilized as a vehicle for the delivery of specialized nutritional products, which might otherwise have an objectionable taste to the patient. Thus, use of the hypoallergenic milk product as a vehicle for offensive-tasting enteral products may obviate the need for introducing such products by stomach tube, which occurs in patients suffering from such diseases as ileitis, colitis, and geriatric nursing home patients.

One non-limiting hypoallergenic milk product according to the present invention suitable for infants contains the following components, based upon 100 ml of product. The amount of each component may be adjusted according to need.

| Protein | |
|---|---|
| Soy protein isolate | 1.8 g |
| Oatmeal protein (optional) | 0.9 to 1.8 g |
| Fat | 3.7 g |
| Carbohydrate | |
| Lactose (or equivalent concentration of sucrose, maltose, glucose or fructose) | 4.6 g |
| Minerals | |

| -continued | |
|---|---|
| Sodium | 41 to 49 mg |
| Potassium | 140 to 152 mg |
| Calcium | 110 to 119 mg |
| Phosphorus | 89 to 93 mg |
| Chloride | 63 to 65 mg |
| Iron (fortified) | 0.05 to 1.2 mg |
| Zinc | 0.38 to 0.43 mg |
| Iodine | 10 micrograms |
| Amino Acids | |
| Methionine | 10 micrograms |
| Cystine | 10 micrograms |
| Vitamins | |
| Vitamin A (water dispersible) | 210 International Units ("I.U.") |
| Vitamin C (as acetate) | 6.0 mg |
| Vitamin D (water dispersible) | 42 I.U. |
| Vitamin E | 1.0 mg |
| Thiamine | 0.04 mg |
| Riboflavin | 0.14 to 0.16 mg |
| Niacin | 0.08 mg |
| Pyridoxine | 0.04 to 0.05 mg |
| Vitamin $B_{12}$ | 0.32 micrograms |
| Folic Acid | 5.0 micrograms |

According to another embodiment, a hypoallergenic milk product suitable for infants has the foregoing components, except that the soy protein isolate, methione and cystine are omitted in favor of a mixture of free amino acids, comprising preferably at least all the essential amino acids, or, alternatively a mixture of short chain polypeptides. Preferably, the infant formula utilizes a mixture of short chain polypeptides derived from milk protein, such as any of the available hydrolysates of milk proteins described above.

The method of the invention is effective in preparing a hypoallergenic milk product wherein the hypoallergenic protein content of milk is reduced from 3.6% to 0.26%, a reduction of more than 90%, and lower, by utilizing a filter capable of retaining 5 kDa molecular weight, more preferably filters capable of retaining even smaller molecules.

The invention will now be described in more detail with reference to the following specific, non-limiting examples:

EXAMPLE 1

To 10 liters of distilled water, 800 grams of "ALA-TAL" 817 milk protein hydrosylate (New Zealand Milk Products) were added, as well as 150 grams of lactose obtained by crystallization of a whey permeate, and 1400 ml of a mixture of milk mineral salts in the form of a delactosed whey permeate. This mixture was purified and deproteinized by passage through a 1 kDa cut-off ultrafiltration membrane ("A.E.S.-1", Advanced Membrane Technology, San Diego, Calif.) at about 21° C. (i.e., about 70° F.). Filtration was facilitated by maintaining a pressure gradient of about 15 Bar (i.e., about 211.5 p.s.i.) to provide a filter flux of 24 liters/m²-hour or more. The final ultrafiltered permeate was then transferred to screw top containers.

EXAMPLE 2

Example 1 was repeated substituting the 2 kDa cut-off ultrafiltration membrane ("GR90 2K", Dow Denmark, Naskov, Denmark) for the 1 kDa cut-off ultrafiltration used in Example 1. The pressure gradient required was increased to about 15 Bar (i.e., about 211.5 p.s.i.). The permeate was then transferred to screw top containers.

EXAMPLE 3

500 ml of the final ultrafiltered permeate of Example 1 was pasteurized at about 72° C. (i.e., about 162° F.) for 20 minutes. This heating further serves to denature any remaining trace of protein. The permeate was then supplemented by adding 2.5 ml of cleared butter oil (as prepared according to Example 5 of U.S. Pat. No. 4,954,361). The supplemented permeate was then homogenized using a homogenizer operating at 9000 r.p.m. The formulation was then decanted into two 4 ounce glass bottles and refrigerated.

EXAMPLE 4

500 ml of the final ultrafiltered permeate of Example 2 was pasteurized at about 72° C. for 20 minutes. This heating further serves to denature any remaining traces of protein. The permeate was then supplemented with 2.5 ml of cleared anhydrous butter oil.

EXAMPLE 5

To 10 liters of distilled water was added 800 grams of "ALATAL" 817 milk protein hydrosylate. This was deproteinated by passage through a 1 kDa cut-off ultrafiltration membrane ("A.E.S.-1", Advanced Membrane Technology, San Diego, Calif.) at about 21° C. (i.e., about 70° F.). Filtration was facilitated by maintaining a pressure gradient of about 5 Bar (i.e., about 75 p.s.i.) to provide a filter flux of 24 liters/m$^2$-hour or more. 500 ml of the ultrafiltered permeate was then transferred to screw top containers. Twenty grams of sucrose and 3.79 g of a mineral salt solution were further added. The final p.H. was 6.7. The mineral salt solution is prepared by grinding and mixing the following quantities of mineral salts in grams:

| | |
|---|---|
| potassium citrate | 5 |
| potassium phosphate (monobasic) | 15.80 |
| sodium citrate | 21.20 |
| potassium sulfate | 1.80 |
| calcium chloride | 13.20 |
| magnesium citrate (monobasic) | 5.02 |
| potassium carbonate | 3.00 |
| potassium chloride | 10.78 |

The above mineral salt quantities are sufficient for 10 liters of stock mineral salt solution. For one liter of solution, 7.59 grams of the dry blend are weighed out and dissolved in 975-990 ml of distilled water. It was not necessary to adjust pH with 1.0-1.5 N KOH or with magnesium oxide.

EXAMPLE 6

Example 5 was repeated substituting the 2 kDa cutoff ultrafiltration membrane ("GR90 2K", Dow Denmark, Naskov, Denmark) for the 1 kDa cut-off ultrafiltration used in Example 16. The pressure gradient required was about 15 Bar (i.e., about 211.5 p.s.i.). Seven grams of refined powdered dextrose was added to 200 ml of Example 6 instead of sucrose as in Example 5. The permeate was then transferred to screw top containers.

EXAMPLE 7

500 ml of the final ultrafiltered and enriched permeate of Example 5 was pasteurized at about 72° C. for 20 minutes. The permeate was supplemented with 2.5 ml of cleared butter oil. The enriched permeate was then homogenized using a homogenizer.

EXAMPLE 8

500 ml of the final ultrafiltered permeate of Example 6 was pasteurized at about 172° C., supplemented with 2.5 ml of cleared anhydrous butter oil and homogenized.

EXAMPLE 9

To 10 liters of distilled water were added 800 grams of "ALATAL" 817 and 150 g of lactose prepared by crystallization from whey permeate. The mixture was deproteinized and purified by passage through a 1 kDa cutoff ultrafiltration membrane ("A.P.S.-1" Advanced Membrane Technology, San Diego, Calif.) at about 21° C. (about 70° F.). Filtration was facilitated by maintaining a pressure gradient of about 15 Bar (about 211.5 PSI) to provide a filter flux of 24 liters/m$^2$-hr or more. 500 ml of the final ultrafiltered permeate was then transferred to screwtop containers. To an 0.5 liter container of the permeate was added 3.79 grams of the mineral salt dry blend of Example 5 and 20.0 grams of glucose in the form of refined corn syrup. The final formulation contains about 3.5% carbohydrate (lactose+glucose); a greatly reduced lactose concentration, without necessitating the use of lactase enzyme.

EXAMPLE 10

All steps of Example 9 were repeated substituting the 2 kDa cut-off ultrafiltration membrane ("GR90 2K" Dow Denmark Naskov, Denmark) for the 2 kDa cut-off ultrafiltration membrane used in Example 9. The pressure gradient was increased to about 15 Bar (about 211.5 PSI). The permeate was then transferred to screw-top containers.

EXAMPLE 11

500 ml of the final ultrafiltered permeate of Example 9 was pasteurized at about 72° C. for 20 minutes. The permeate was then supplemented with 2.5 ml of cleared anhydrous butter oil and homogenized as before.

EXAMPLE 12

500 ml of the final ultrafiltered permeate of Example 10 was pasteurized at about 72° C., supplemented with 2.5 ml of cleared anhydrous butter oil and homogenized.

In each of Examples 1-12, about 2.0 grams of a commercial, vanilla-flavored oat soy preparation was added to a 100 ml sample of the resulting permeate for body, flavor and emulsification enhancement. This mixture was then further homogenized and emulsified with a homogenizer/emulsifier operating at 9,000 r.p.m.

EXAMPLE 13

To 10 liters of distilled water was added 800 grams of "ALATAL" 817 and 1400 ml of delactose whey permeate. The mixture was then deproteinized by passage through a 1 kDa cut-off ultrafiltration membrane ("A.E.S.-1") at about 21° C. Filtration was facilitated by maintaining a pressure gradient of about 15 Bar (211.5 PSI) to provide a filter flux of 24 liters/m$^2$-hour or more. The final ultrafilter permeate was then transferred to screw top containers. 0.5 liter of the synthetic permeate is then supplemented with 5 g of dextrose. The final formulation contains about 3.4% carbohydrate (lactose+glucose); a greatly reduced lactose without necessitating the use of lactase enzyme.

EXAMPLE 14

Example 13 was repeated substituting the 2 kDa cut-off ultrafiltration membrane ("GR 90 2K") for the 1 kDa cut-off ultrafiltration filter used in Example 13. The pressure gradient was increased to 15 Bar.

EXAMPLE 15

500 ml of the final ultrafiltered permeate of Example 14 is pasteurized at about 72° C. for twenty minutes, supplemented with 2.5 ml of cleared anhydrous butter oil and homogenized as before.

EXAMPLE 16

500 ml of the final ultrafiltered permeate of Example 15 is pasteurized, supplemented with 2.5 ml of cleared anhydrous butter oil and homogenized.

In each of Examples 13-16, a 100 ml sample of the resulting permeate is mixed with about 2.0 grams of a commercial, vanilla-flavored oat soy preparation as set out above for body, flavor and emulsification enhancement.

The presence of medication utilized to treat milkproducing cows is undesirable in milk for human consumption. The ultrafiltration method described herein is believed to effectively reduce the level of veterinary pharmaceuticals contained in fractions of cow's milk. Approximately 75% of monocyclic drugs, e.g., penicillin and sulfonamides, which may be present in the milk, are attached to the milk's protein fraction. Approximately 25% or more of tricyclic compounds, and approximately 50% of bicyclic compounds, are similarly found attached to the protein fraction. Thus, it may be readily appreciated that removal of milk protein, as in the practice of the present invention, serves also to substantially reduce the level of veterinary medications which may be contained in cow's milk.

Recently, bovine immunodeficiency infection in cows has been reported to result in decreased milk production. While this viral agent has not been found to be transmissible to humans, the ultrafiltration procedure utilized herein excludes viruses and bacteria, which are generally larger than 100 kDa and 1,000 kDa respectively. Thus, ultrafiltration ensures that these disease agents which may be carried in milk protein hydrosylates and/or delactose whey permeates utilized in the practice of the invention, do not infect the resulting hypoallergenic milk product.

The anaphylactic type of allergic reactions may be caused by milk proteins. Many patients, particularly children, have symptoms of recurrent colds, bronchitis, asthmatic bronchitis, asthma, as well as recurrent sinusitis and/or otitis. These symptoms are often relieved by avoidance of milk. These symptoms may actually be caused by viral or bacterial protein present in milk. Where milk components such as milk protein hydrosylates and delactose whey are utilized in the practice of the present invention, the ultrafiltration procedure removes protein, as well as bacteria and viruses which may cause these symptoms.

The present invention may be embodied in other specific forms without departing from the spirit or essential attributes thereof and, accordingly, reference should be made to the appended claims, rather than to the foregoing specification, as indicating the scope of the invention.

I claim:

1. A palatable hypoallergenic milk product comprising:
   (a) a mineral salt component substantially free of allergenic protein, said mineral salt component comprising a mixture of mineral salts having approximately the mineral content of natural milk;
   (b) a carbohydrate component substantially free of allergenic protein, said carbohydrate component comprising one or more carbohydrates; and
   (c) a hypoallergenic protein component having a molecular weight of not more than 5 kDa, said hypoallergenic protein component being selected from the group consisting of hypoallergenic protein, amino acids, polypeptides and combinations thereof.

2. A milk product according to claim 1 wherein the mixture of mineral salts is derived from delactosed whey.

3. A milk product according to claim 1 including hypoallergenic fat.

4. A milk product according to claim 3 wherein the hypoallergenic fat is selected from the group consisting of deproteinized butter, vegetable oil, and combinations thereof.

5. A milk product according to claim 1 wherein the hypoallergenic protein component is selected from the group consisting of amino acids and polypeptides which are derived from a milk protein.

6. A milk product according to claim 5 wherein the hypoallergenic component is selected from the group consisting of amino acids and polypeptides which are derived from lactalbumin.

7. A milk product according to claim 1 wherein the hypoallergenic protein component comprises polypeptides having a molecular weight of not more than about 3.5 kDa.

8. A milk product according to claim 7 wherein the hypoallergenic protein component comprises polypeptides having a molecular weight of not more than about 2 kDa.

9. A milk product according to claim 8 wherein said milk product is substantially free of protein of animal origin as determined by the substantial absence of protein bands upon sodium dodecyl sulfate polyacrylamide gel electrophoresis and silver staining.

10. A milk product according to claim 8 wherein the hypoallergenic protein component comprises polypeptides having a molecular weight of not more than about 1.5 kDa.

11. A milk product according to claim 10 wherein the hypoallergenic component comprises polypeptides having a molecular weight greater than about 1 kDa.

12. A milk product according to claim 7 wherein said milk product is substantially free of protein of animal origin as determined by the substantial absence of protein bands upon sodium dodecyl sulfate polyacrylamide gel electrophoresis and silver staining.

13. A milk product according to claim 10 wherein said milk product is substantially free of protein of animal origin as determined by the substantial absence of protein bands upon sodium dodecyl sulfate polyacrylamide gel electrophoresis and silver staining.

14. A milk product according to claim 1 wherein the hypoallergenic protein component is selected from the group consisting of cereal protein, vegetable protein, and combinations thereof.

15. A milk product according to claim 1 wherein the carbohydrate amount comprises lactose.

16. A milk product according to claim 15 wherein the lactose comprises deproteinized lactose.

17. A milk product according to claim 1 wherein said amino acids, polypeptides, or both, are derived from at least one component selected from the group consisting of casein, soy flour and lactalbumin.

18. A milk product according to claim 1 further comprising a hypoallergenic milk chocolate prepared with hypoallergenic milk.

19. A milk product according to claim 18 wherein the mixture of mineral salts is derived from delactosed whey.

20. A milk product according to claim 18 further comprising hypoallergenic fat.

21. A milk product according to claim 20 wherein the hypoallergenic fat is selected from the group consisting of deproteinized butter, vegetable oil, and combinations thereof.

22. A milk product according to claim 18 wherein in the hypoallergenic protein component is selected from the group consisting of amino acids and polypeptides which are derived from milk protein.

23. A milk product according to claim 22 wherein the hypoallergenic protein component is selected from the group consisting of amino acids and polypeptides which are derived from lactalbumin.

24. A milk product according to claim 18 wherein the hypoallergenic protein component comprises polypeptides having a molecular weight of not more than 3.5 kDa.

25. A milk product according to claim 24 wherein said milk product is substantially free of protein of animal origin as determined by the substantial absence of protein bands upon sodium dodecyl sulfate polyacrylamide gel electrophoresis and silver staining.

26. A milk product according to claim 25 wherein said milk product is substantially free of protein of animal origin as determined by the substantial absence of protein bands upon sodium dodecyl sulfate polyacrylamide gel electrophoresis and silver staining.

27. A milk product according to claim 24 wherein the hypoallergenic protein component comprises polypeptides having a molecular weight of not more than 2 kDa.

28. A milk product according to claim 27 wherein the hypoallergenic protein component comprises polypeptides having a molecular weight of not more than 1.5 kDa.

29. A milk product according to claim 28 wherein said milk product is substantially free of protein of animal origin as determined by the substantial absence of protein bands upon sodium dodecyl sulfate polyacrylamide gel electrophoresis and silver staining.

30. A milk product according to claim 28 wherein the hypoallergenic protein component comprises polypeptides having a molecular weight not more than about 1 kDa.

31. A milk product according to claim 30 wherein said milk product is substantially free of protein of animal origin as determined by the substantial absence of protein bands upon sodium dodecyl sulfate polyacrylamide gel electrophoresis and silver staining.

32. A milk product according to claim 18 wherein the hypoallergenic protein component is selected from the group consisting of cereal protein, vegetable protein and combinations thereof.

33. A milk product according to claim 18 wherein the lactose comprises deproteinized lactose.

34. A milk product according to claim 18 wherein said amino acids, polypeptides, or both, are derived from at least one component selected from the group consisting of casein, soy flour and lactalbumin.

35. A process for making a palatable hypoallergenic milk product comprising:
    (a) forming an aqueous mixture comprising:
        (i) a mineral salt component comprising a mixture of mineral salts having approximately the mineral content of natural milk;
        (ii) a carbohydrate component comprising one or more carbohydrates; and
        (iii) a protein component selected from the group consisting of hypoallergenic protein, amino acids, polypeptides and combinations thereof;
    (b) filtering the aqueous mixture through a filter which will only allow molecules with a molecular weight less than or equal to about 5 kDa to pass therethrough, to form a filtration permeate; and
    (c) collecting the filtration permeate from step (b).

36. A process according to claim 35 wherein the mixture of mineral salts comprises delactosed whey.

37. A process according to claim 35 wherein hypoallergenic fat is added to the aqueous mixture or filtration permeate.

38. A milk product according to claim 37 wherein the hypoallergenic fat is selected from the group consisting of deproteinized butter, vegetable oil, and combinations thereof.

39. A process according to claim 35 wherein the hypoallergenic component is selected from the group consisting of amino acids and polypeptides which are derived from a milk protein.

40. A process according to claim 39 wherein the hypoallergenic component is selected from the group consisting of amino acids and polypeptides which are derived from lactalbumin.

41. A process according to claim 35 wherein the hypoallergenic component comprises polypeptides having a molecular weight of not more than about 1.5 kDa.

42. A process according to claim 41 wherein the filter will allow only molecules with a molecular weight of less than or equal to about 3.5 kDa to pass therethrough.

43. A process product according to claim 42 wherein said filtration permeate is substantially free of protein of animal origin as determined by the substantial absence of protein bands upon sodium dodecyl sulfate polyacrylamide gel electrophoresis and silver staining.

44. A process according to claim 42 wherein the filter will allow only molecules with a molecular weight of less than or equal to about 2 kDa to pass therethrough.

45. A process according to claim 44 wherein said filtration permeate is substantially free of protein of animal origin as determined by the substantial absence of protein bands upon sodium dodecyl sulfate polyacrylamide gel electrophoresis and silver staining.

46. A process according to claim 44 wherein the filter will allow only molecules with a molecular weight of less than or equal to about 1 kDa to pass therethrough.

47. A process according to claim 23 wherein said filtration permeate is substantially free of protein of animal origin as determined by the substantial absence of protein bands upon sodium dodecyl sulfate polyacrylamide gel electrophoresis and silver staining.

48. A process according to claim 35 wherein the hypoallergenic protein component comprises hypoallergenic protein being selected from the group consisting of cereal protein, vegetable protein and combinations thereof.

49. A process according to claim 35 wherein the filtration comprises dialysis.

50. A process according to claim 35 wherein the carbohydrate component comprises lactose.

51. A process according to claim 50 wherein the lactose comprises deproteinized lactose.

52. A process according to claim 35 wherein hypoallergenic milk chocolate prepared with hypoallergenic milk is added to the aqueous mixture, the filtration permeate, or both.

53. A process according to claim 52 wherein the mixture of mineral salts comprises delactosed whey.

54. A process according to claim 52 wherein hypoallergenic fat is added to the aqueous mixture, the filtration permeate or both.

55. A process according to claim 54 wherein the hypoallergenic fat is selected from the group consisting of deproteinized butter, vegetable oil, and a combination thereof.

56. A process according to claim 52 wherein the protein component is selected from the group consisting of amino acids and polypeptides which are derived from a milk protein.

57. A process according to claim 56 wherein the protein component is selected from the group consisting of amino acids and polypeptides which are derived from lactalbumin.

58. A process according to claim 52 wherein the protein component comprises polypeptides having a molecular weight of not more than about 1.5 kDa.

59. A process according to claim 52 wherein the filter will allow only molecules with a molecular weight of 3.5 kDa to pass therethrough.

60. A process according to claim 59 wherein said filtration permeate is substantially free of protein of animal origin as determined by the substantial absence of protein bands upon sodium dodecyl sulfate polyacrylamide gel electrophoresis and silver staining.

61. A process according to claim 59 wherein the filter will allow only molecules with a molecular weight of less than or equal to about 2 kDa to pass therethrough.

62. A process according to claim 61 wherein said filtration permeate is substantially free of protein of animal origin as determined by the substantial absence of protein bands upon sodium dodecyl sulfate polyacrylamide gel electrophoresis and silver staining.

63. A process according to claim 61 wherein the filter will allow only molecules with a molecular weight of less than or equal to about 1 kDa to pass therethrough.

64. A process according to claim 63 wherein said filtration permeate is substantially free of protein of animal origin as determined by the substantial absence of protein bands upon sodium dodecyl sulfate polyacrylamide gel electrophoresis and silver staining.

65. A process according to claim 52 wherein the protein component comprises hypoallergenic protein selected from the group consisting of cereal protein, vegetable protein and a combination thereof.

66. A process according to claim 52 wherein the filtration step comprises dialysis.

67. A process according to claim 52 wherein the carbohydrate component comprises lactose.

68. A process according to claim 67 wherein the lactose comprises deproteinized lactose.

69. A process according to claim 52 wherein said amino acids, polypeptides, or both, are derived from at least one component selected from the group consisting of casein, soy flour and lactalbumin.

70. A process according to claim 35 wherein said amino acids, polypeptides, or both, are derived from at least one component selected from the group consisting of casein, soy flour and lactalbumin.

71. A process for making a palatable hypoallergenic process comprising:
(a) filtering through a filter which will only allow molecules with a molecular weight less than or equal to about 5 kDa to pass therethrough, the following components, to form a filtration permeate:
  (i) a mineral salt component comprising a mixture of mineral salts having approximately the same mineral content of natural milk, and
  (ii) a carbohydrate component comprising one or more carbohydrates; and
(b) combining the filtration permeate from step (a) with a hypoallergenic protein component having a molecular weight of not more than 5 kDa, said hypoallergenic protein component being selected from the group consisting of hypoallergenic protein, amino acids, polypeptides and combinations thereof to form a hypoallergenic process.

72. A process according to claim 71 wherein the mineral salt component is derived from delactosed whey.

73. A process according to claim 71 wherein the carbohydrate component comprises lactose.

74. A process according to claim 71 wherein the hypoallergenic protein component is selected from the group consisting of amino acids and polypeptides which are derived from milk protein.

75. A process according to claim 74 wherein the hypoallergenic protein component is selected from the group consisting of amino acids and polypeptides which are derived from lactalbumin.

76. A process according to claim 71 wherein the hypoallergenic protein component comprises polypeptides having a molecular weight of not more than about 1.5 kDa.

77. A process according to claim 71 wherein hypoallergenic fat is added to the aqueous mixture or filtration permeate.

78. A process according to claim 77 wherein the hypoallergenic fat is selected from the group consisting of deproteinized butter, vegetable oil and combinations thereof.

79. A process according to claim 71 wherein the filter will allow only molecules with a molecular weight of less than or equal to about 3.5 kDa to pass therethrough.

80. A process according to claim 79 wherein said milk product is substantially free of protein of animal origin as determined by the substantial absence of protein bands upon sodium dodecyl sulfate polyacrylamide gel electrophoresis and silver staining.

81. A process according to claim 79 wherein the filter will allow only molecules with a molecular weight of less than or equal to about 2 kDa to pass therethrough.

82. A process according to claim 81 wherein said milk product is substantially free of protein of animal origin as determined by the substantial absence of protein bands upon sodium dodecyl sulfate polyacrylamide gel electrophoresis and silver staining.

83. A process according to claim 81 wherein the filter will allow only molecules with a molecular weight of less than or equal to about 1 kDa to pass therethrough.

84. A process according to claim 41 wherein said milk product is substantially free of protein of animal origin as determined by the substantial absence of protein bands upon sodium dodecyl sulfate polyacrylamide gel electrophoresis and silver staining.

85. A process according to claim 71 wherein the hypoallergenic protein component comprises hypoallergenic protein selected from the group consisting of cereal protein, vegetable protein and combinations thereof.

86. A process according to claim 71 wherein said amino acids, polypeptides, or both, are derived from at least one component selected from the group consisting of casein, soy flour and lactalbumin.

87. A process according to claim 71 wherein hypoallergenic milk chocolate prepared with hypoallergenic milk is combined with the mineral salt component and the carbohydrate component prior to filtering, the filtration permeate, or both.

88. A process according to claim 87 wherein the mixture of mineral salts comprises delactosed whey.

89. A process according to claim 87 wherein hypoallergenic fat is combined with the mineral salt component and the carbohydrate component prior to filtering, the filtration permeate or both.

90. A process according to claim 89 wherein the hypoallergenic fat is selected from the group consisting of deproteinized butter, vegetable oil, and a combination thereof.

91. A process according to claim 87 wherein the hypoallergenic protein component is selected from the group consisting of amino acids and polypeptides which are derived from a milk protein.

92. A process according to claim 91 wherein the hypoallergenic protein component is selected from the group consisting of amino acids and polypeptides which are derived from lactalbumin.

93. A process according to claim 87 wherein the hypoallergenic protein component comprises polypeptides having a molecular weight of not more than about 1.5 kDa.

94. A process according to claim 87 wherein the filter will allow only molecules with a molecular weight of 3.5 kDa to pass therethrough.

95. A process according to claim 94 wherein said milk product is substantially free of protein of animal origin as determined by the substantial absence of protein bands upon sodium dodecyl sulfate polyacrylamide gel electrophoresis and silver staining.

96. A process according to claim 94 wherein the filter will allow only molecules with a molecular weight of less than or equal to about 2 kDa to pass therethrough.

97. A process according to claim 96 wherein said milk product is substantially free of protein of animal origin as determined by the substantial absence of protein bands upon sodium dodecyl sulfate polyacrylamide gel electrophoresis and silver staining.

98. A process according to claim 96 wherein the filter will allow only molecules with a molecular weight of less than or equal to about 1 kDa to pass therethrough.

99. A process according to claim 98 wherein said milk product is substantially free of protein of animal origin as determined by the substantial absence of protein bands upon sodium dodecyl sulfate polyacrylamide gel electrophoresis and silver staining.

100. A process according to claim 87 wherein the hypoallergenic protein component comprises hypoallergenic protein selected from the group consisting of cereal protein, vegetable protein and a combination thereof.

101. A process according to claim 87 wherein the filtration step comprises dialysis.

102. A process according to claim 87 wherein the carbohydrate component comprises lactose.

103. A process according to claim 102 wherein the lactose comprises deproteinized lactose.

104. A process according to claim 87 wherein said amino acids, polypeptides, or both, are derived from at least one component selected from the group consisting of casein, soy flour and lactalbumin.

105. A process for making a palatable hypoallergenic milk product comprising:
 (a) filtering through a filter which will only allow molecules with a molecular weight less than or equal to about 5 kDa to pass therethrough, a carbohydrate component comprising one or more carbohydrates, to form a filtration permeate:
 (b) combining the filtration permeate from step (a) with the following components to form a hypoallergenic milk product:
  (i) a mineral salt component substantially free of allergenic protein, said mineral salt component comprising a mixture of mineral salts having approximately the same mineral content of natural milk, and
  (ii) a hypoallergenic protein component having a molecular weight of not more than 5 kDa, said hypoallergenic protein component being selected from the group consisting of hypoallergenic protein, amino acids, polypeptides and combinations thereof.

106. A process according to claim 105 wherein the filter will allow only molecules with a molecular weight of 3.5 kDa to pass therethrough.

107. A process according to claim 106 wherein said filtration permeate is substantially free of protein of animal origin as determined by the substantial absence of protein bands upon sodium dodecyl sulfate polyacrylamide gel electrophoresis and silver staining.

108. A process according to claim 106 wherein the filter will allow only molecules with a molecular weight of less than or equal to about 2 kDa to pass therethrough.

109. A process according to claim 108 wherein said filtration permeate is substantially free of protein of animal origin as determined by the substantial absence of protein bands upon sodium dodecyl sulfate polyacrylamide gel electrophoresis and silver staining.

110. A process according to claim 108 wherein the filter will allow only molecules with a molecular weight of less than or equal to about 1 kDa to pass therethrough.

111. A process according to claim 110 wherein said filtration permeate is substantially free of protein of animal origin as determined by the substantial absence of protein bands upon sodium dodecyl sulfate polyacrylamide gel electrophoresis and silver staining.

112. A process according to claim 105 wherein the carbohydrate component comprises lactose.

113. A process according to claim 105 wherein the lactose comprises deproteinized lactose.

114. A process according to claim 105 wherein the hypoallergenic protein component is selected from the group consisting of amino acids and polypeptides which are derived from milk protein.

115. A process according to claim 114 wherein the hypoallergenic protein component is selected from the group consisting of amino acids and polypeptides which are derived from lactalbumin.

116. A process according to claim 105 wherein hypoallergenic fat is added to the carbohydrate component prior to filtering, the filtration permeate, or both.

117. A process according to claim 116 wherein the hypoallergenic fat is selected from the group consisting of deproteinized butter, vegetable oil and combinations thereof.

118. A process according to claim 105 wherein said amino acids, polypeptides, or both, are derived from at least one component selected from the group consisting of casein, soy flour and lactalbumin.

119. A process according to claim 105 wherein hypoallergenic milk chocolate prepared with hypoallergenic milk is added to the carbohydrate component prior to filtering, the filtration permeate, or both.

120. A process according to claim 105 wherein the mixture of mineral salts comprises delactosed whey.

121. A process for making a palatable hypoallergenic milk product comprising:
(a) filtering through a filter which will only allow molecules with a molecular weight less than or equal to about 5 kDa to pass therethrough, a mineral salt component comprising a mixture of mineral salts having approximately the same mineral content of natural milk to form a filtration permeate: and
(b) combining the filtration permeate from step (a) with the following components to form a hypoallergenic milk product:
(i) a carbohydrate component substantially free of allergenic protein, said carbohydrate component comprising one or more carbohydrates, and
(ii) a hypoallergenic protein component having a molecular weight of not more than 5 kDa, said hypoallergenic protein component being selected from the group consisting of hypoallergenic protein, amino acids, polypeptides and combinations thereof.

122. A process according to claim 121 wherein the filter will allow only molecules with a molecular weight of 3.5 kDa to pass therethrough.

123. A process according to claim 121 wherein said filtration permeate is substantially free of protein of animal origin as determined by the substantial absence of protein bands upon sodium dodecyl sulfate polyacrylamide gel electrophoresis and silver staining.

124. A process according to claim 121 wherein the filter will allow only molecules with a molecular weight of less than or equal to about 2 kDa to pass therethrough.

125. A process according to claim 124 wherein said filtration permeate is substantially free of protein of animal origin as determined by the substantial absence of protein bands upon sodium dodecyl sulfate polyacrylamide gel electrophoresis and silver staining.

126. A process according to claim 124 wherein the filter will allow only molecules with a molecular weight of less than or equal to about 1 kDa to pass therethrough.

127. A process according to claim 126 wherein said filtration permeate is substantially free of protein of animal origin as determined by the substantial absence of protein bands upon sodium dodecyl sulfate polyacrylamide gel electrophoresis and silver staining.

128. A process according to claim 121 wherein the carbohydrate component comprises deproteinized lactose.

129. A process according to claim 121 wherein the hypoallergenic protein component is selected from the group consisting of amino acids and polypeptides which are derived from milk protein.

130. A process according to claim 129 wherein the hypoallergenic protein component is selected from the group consisting of amino acids and polypeptides which are derived from lactalbumin.

131. A process according to claim 121 wherein hypoallergenic fat is added to the carbohydrate component prior to filtering, the filtration permeate, or both.

132. A process according to claim 131 wherein the hypoallergenic fat is selected from the group consisting of deproteinized butter, vegetable oil and combinations thereof.

133. A process according to claim 121 wherein said amino acids, polypeptides, or both, are derived from at least one component selected from the group consisting of casein, soy flour and lactalbumin.

134. A process according to claim 121 wherein hypoallergenic milk chocolate prepared with hypoallergenic milk is added to the carbohydrate component prior to filtering, the filtration permeate, or both.

135. A process according to claim 121 wherein the mixture of mineral salts comprises delactosed whey.

136. A process for making a palatable hypoallergenic milk product comprising:
(a) filtering through a filter which will only allow molecules with a molecular weight less than or equal to about 5 kDa to pass therethrough, a mineral salt component, to form a filtration permeate:
(i) a mineral salt component comprising a mixture of mineral salts having approximately the same mineral content of natural milk, and
(ii) a protein component selected from the group consisting of hypoallergenic protein, amino acids, polypeptides and combinations thereof; and
(b) combining the filtration permeate from step (a) with a carbohydrate component substantially free of allergenic protein, said carbohydrate component comprising one or more carbohydrates to form a hypoallergenic milk product.

137. A process according to claim 136 wherein the filter will allow only molecules with a molecular weight of 3.5 kDa to pass therethrough.

138. A process according to claim 136 wherein said filtration permeate is substantially free of protein of animal origin as determined by the substantial absence of protein bands upon sodium dodecyl sulfate polyacrylamide gel electrophoresis and silver staining.

139. A process according to claim 136 wherein the filter will allow only molecules with a molecular weight of less than or equal to about 2 kDa to pass therethrough.

140. A process according to claim 139 wherein said filtration permeate is substantially free of protein of animal origin as determined by the substantial absence of protein bands upon sodium dodecyl sulfate polyacrylamide gel electrophoresis and silver staining.

141. A process according to claim 139 wherein the filter will allow only molecules with a molecular weight of less than or equal to about 1 kDa to pass therethrough.

142. A process according to claim 141 wherein said filtration permeate is substantially free of protein of animal origin as determined by the substantial absence of protein bands upon sodium dodecyl sulfate polyacrylamide gel electrophoresis and silver staining.

143. A process according to claim 136 wherein the carbohydrate component comprises deproteinized lactose.

144. A process according to claim 136 wherein the hypoallergenic protein component is selected from the group consisting of amino acids and polypeptides which are derived from milk protein.

145. A process according to claim 144 wherein the hypoallergenic protein component is selected from the group consisting of amino acids and polypeptides which are derived from lactalbumin.

146. A process according to claim 136 wherein hypoallergenic fat is added to the carbohydrate component prior to filtering, the filtration permeate, or both.

147. A process according to claim 146 wherein the hypoallergenic fat is selected from the group consisting of deproteinized butter, vegetable oil and combinations thereof.

148. A process according to claim 136 wherein said amino acids, polypeptides, or both, are derived from at least one component selected from the group consisting of casein, soy flour and lactalbumin.

149. A process according to claim 136 wherein hypoallergenic milk chocolate prepared with hypoallergenic milk is added to the carbohydrate component prior to filtering, the filtration permeate, or both.

150. A process according to claim 136 wherein the mixture of mineral salts comprises delactosed whey.

151. A process for making a palatable hypoallergenic milk product comprising:
(a) filtering through a filter which will only allow molecules with a molecular weight less than or equal to about 5 kDa to pass therethrough, the following components, to form a filtration permeate:
  (i) a carbohydrate component comprising one or more carbohydrates, and
  (ii) a protein component selected from the group consisting of hypoallergenic protein, amino acids, polypeptides and combinations thereof; and
(b) combining the filtration permeate from step (a) with a mineral salt component substantially free of allergenic protein, said mineral salt component comprising mineral content of natural milk to form a hypoallergenic milk product.

152. A process according to claim 151 wherein the filter will allow only molecules with a molecular weight of 3.5 kDa to pass therethrough.

153. A process according to claim 151 wherein said filtration permeate is substantially free of protein of animal origin as determined by the substantial absence of protein bands upon sodium dodecyl sulfate polyacrylamide gel electrophoresis and silver staining.

154. A process according to claim 151 wherein the filter will allow only molecules with a molecular weight of less than or equal to about 2 kDa to pass therethrough.

155. A process according to claim 154 wherein said filtration permeate is substantially free of protein of animal origin as determined by the substantial absence of protein bands upon sodium dodecyl sulfate polyacrylamide gel electrophoresis and silver staining.

156. A process according to claim 154 wherein the filter will allow only molecules with a molecular weight of less than or equal to about 1 kDa to pass therethrough.

157. A process according to claim 156 wherein said filtration permeate is substantially free of protein of animal origin as determined by the substantial absence of protein bands upon sodium dodecyl sulfate polyacrylamide gel electrophoresis and silver staining.

158. A process according to claim 151 wherein the carbohydrate component comprises deproteinized lactose.

159. A process according to claim 151 wherein the hypoallergenic protein component is selected from the group consisting of amino acids and polypeptides which are derived from milk protein.

160. A process according to claim 159 wherein the hypoallergenic protein component is selected from the group consisting of amino acids and polypeptides which are derived from lactalbumin.

161. A process according to claim 151 wherein hypoallergenic fat is added to the carbohydrate component prior to filtering, the filtration permeate, or both.

162. A process according to claim 161 wherein the hypoallergenic fat is selected from the group consisting of deproteinized butter, vegetable oil and combinations thereof.

163. A process according to claim 151 wherein said amino acids, polypeptides, or both, are derived from at least one component selected from the group consisting of casein, soy flour and lactalbumin.

164. A process according to claim 151 wherein hypoallergenic milk chocolate prepared with hypoallergenic milk is added to the carbohydrate component prior to filtering, the filtration permeate, or both.

165. A process according to claim 151 wherein the mixture of mineral salts comprises delactosed whey.

* * * * *